Patented July 7, 1931

1,813,478

UNITED STATES PATENT OFFICE

LEONID ANDRUSSOW, OF LIVONIA, AND FELIX DUERR, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CATALYSTS

No Drawing. Application filed June 20, 1929, Serial No. 372,527, and in Germany July 21, 1928.

This invention relates to improvements in the manufacture and production of catalysts, in particular for the oxidation of hydrocarbons.

It is already known that gaseous or vaporous hydrocarbons, or gaseous or vaporous mixtures containing the same, for example methane, ethane or natural or industrial gases containing these gases, can be converted into valuable compounds by passing them over catalysts in the presence of oxygen or gases containing the same, for example air. Compounds of several inorganic acids containing oxygen, for example phosphates and borates, amongst others, can be employed as catalysts for this purpose. The objection to these catalysts is that even if they possess an activity sufficient for industrial purposes at all their activity quickly subsides. For example they exhibit a marked tendency to vitrify.

We have now found that catalysts possessing excellent activity, which is not impaired, for example by vitrification, even after employment for a long period of time, are obtained by adding to a solution of one or more metal salts, which is acidified to prevent hydrolysis, a solution of a salt of an inorganic acid containing oxygen, for example phosphates or borates of the alkali metals and capable of precipitating the metal salt, to which latter solution caustic alkali has been added in such a quantity that a slight excess of alkali remains in the solution after the precipitation. As examples of metal salts from which the precipitation takes place may be mentioned the water soluble salts of metals forming oxides which are not reducible to the metal with hydrogen at temperatures below 600° C., as for example salts of the earth metals or rare earth metals or certain heavy metals such as aluminium, cerium, tin, zinc or cadmium or soluble salts of metals of the iron group such as iron, cobalt or nickel. An amount of the solution is employed for the precipitation, which is usually several times in excess of that theoretically necessary. The precipitate is then dried, if desired after a previous washing treatment.

It is advantageous to bring the catalysts thus obtained into contact with small quantities of corrosive gases, such as halogens, hydrogen halides, nitrosyl chloride and the like, before or during their employment for the catalytic conversion. The catalysts thus obtained are particularly suitable in the said process for the oxidation of hydrocarbons.

The process of converting the hydrocarbons can be carried out at any suitable pressure, for example at atmospheric pressure, or elevated pressure, but in some cases also under reduced pressure. The process is carried out at elevated temperatures and usually at about 500° to 700° centigrade, and if desired in a cycle.

The following examples will further illustrate the nature of this invention but the invention is not restricted to these examples. The parts are by volume.

Example 1

A mixture of 90 parts of methane and 10 parts of oxygen to which small quantities, for example 0.1 to 0.5 per cent by volume of chlorine have been added, is passed per hour over about 0.1 part of a highly porous catalyst at about 600° to 700° centigrade and at ordinary pressure. The catalyst is prepared by the precipitation of a weakly acid solution of the nitrates of cerium, cadmium, and aluminium in about equimolecular proportions by the addition of three times the calculated quantity of secondary alkali metal phosphate, calculated with reference to the total molecular quantity of nitrates employed, to which has been added 100 cubic centimetres of a normal solution of caustic alkali for each gram-molecule of secondary alkali metal phosphate, by washing and then drying the precipitate at about 110° centigrade. About 5 parts of formaldehyde are thus obtained, that is from 20 to 30 times the quantity of formaldehyde obtainable from a catalyst prepared without the addition of alkali.

Example 2

A gaseous mixture consisting of 1 part of pentane vapour and 7 parts of air is passed under ordinary pressure over a catalyst containing the borates of iron and of zinc at about 550° centigrade. The catalyst is prepared by precipitating an acid solution containing equal molecular proportions of the nitrates of iron and zinc with a solution of twice the quantity of sodium tetraborate to which 25 cubic centimetres of normal caustic soda to each gram-molecule of borate have been added, by washing and then drying the precipitate at about 110° centigrade. A good yield of aldehydes and ketones, in addition to olefines and other oxidation products, is obtained, and the catalyst retains its porous non-vitreous nature.

What we claim is:—

1. A process for the production of catalysts, which comprises adding to a solution of at least one metal salt selected from the class consisting of the soluble salts of the metals forming difficultly reducible oxides and the metals of the iron group, which is acidified to prevent hydrolysis, a solution of a salt of an acid selected from the group consisting of phosphoric acid and boric acid, to which latter solution caustic alkali has been added in such a quantity that a slight excess of alkali remains in the solution after precipitation, and drying the precipitate.

2. A process for the production of catalysts for the oxidation of hydrocarbons, which comprises adding to a solution of at least one metal salt, which is acidified to prevent hydrolysis, a solution of a salt of an inorganic acid containing oxygen and capable of precipitating the metal salt, to which latter solution caustic alkali has been added in such a quantity that a slight excess of alkali remains in the solution after precipitation, drying the precipitate, and bringing the catalysts thus obtained at any time up to a moment during the conversion treatment into contact with small quantities of a corrosive gas.

3. A process for the production of catalysts, which comprises adding to a weakly acid solution of the nitrates of cerium, cadmium and aluminium, three times the calculated quantity of secondary alkali metal phosphate calculated with reference to the total molecular quantity of nitrates employed, to which has been added 100 cubic centimetres of a normal solution of caustic alkali for each gram-molecule of secondary alkali metal phosphate, and washing and drying the precipitate at about 110° C.

In testimony whereof we have hereunto set our hands.

LEONID ANDRUSSOW.
FELIX DUERR.